United States Patent [19]

Boughers

[11] 4,003,443
[45] Jan. 18, 1977

[54] MULTIPLE WHEEL MOTORCYCLE SUSPENSION AND DRIVE SYSTEM

[76] Inventor: Gordon Neal Boughers, Dublin Road, Street, Md. 21154

[22] Filed: July 31, 1975

[21] Appl. No.: 600,591

[52] U.S. Cl. .................................. 180/27; 180/72; 280/104; 280/112 A

[51] Int. Cl.² .................. B62K 25/00; B60G 19/00

[58] Field of Search ............... 180/27, 25, 41, 72; 280/112 A, 112 R, 111, 95 R, 87, 6 H, 104

[56] References Cited
UNITED STATES PATENTS

| | | | |
|---|---|---|---|
| 2,038,843 | 4/1936 | Jones | 180/27 |
| 2,521,986 | 9/1950 | Lips | 280/95 R |
| 2,633,926 | 4/1953 | Minor | 280/111 |
| 2,887,322 | 5/1959 | DeMonge | 280/112 A X |
| 3,024,860 | 3/1962 | Nicolai | 180/32 |
| 3,175,637 | 3/1965 | Honda | 180/72 |
| 3,309,097 | 3/1967 | Seeber | 180/41 |
| 3,504,934 | 4/1970 | Wallis | 180/27 |
| 3,572,456 | 3/1971 | Hedly | 180/27 |
| 3,583,727 | 6/1971 | Wallis | 180/27 |

Primary Examiner—Kenneth H. Betts
Attorney, Agent, or Firm—John F. McClellan, Sr.

[57] ABSTRACT

An independent rear suspension and drive system for a motorcycle having a steerable front wheel and a laterally mounted pair of rear wheels, including a transverse driveshaft having a differential connection with the engine, a pair of trailing-links journaled on the driveshaft and mounting the respective rear wheels pivotally about the driveshaft, a pair of driveshaft output sprockets respectively on opposite sides of the differential, a pair of chains operatively connecting the driveshaft output sprockets with respective wheel drive sprockets, and a transverse arm centrally pivoted to the frame and having at each end a dashpot connecting to a respective trailing link; associated dashpot spring means is arranged to be determinative of the combined trailing link positions relative to each other, but not to the motorcycle frame.

9 Claims, 6 Drawing Figures

MULTIPLE WHEEL MOTORCYCLE SUSPENSION AND DRIVE SYSTEM

This invention relates generally to inertially stabilized vehicles and specifically to motorcycle suspension and drive systems.

A primary object of the invention is to provide a rear suspension system incorporating a pair of laterally disposed rear wheels in an independent mounting and drive in such manner as to give greater and more uniform traction in combination with more riding stability, comfort, safety and response than has previously been available in motorcycles of this type. Improving these qualities is particularly important in view of the higher power available in presently manufactured motorcycles of all classes and in view of the increasing popularity and increasing accident rates of motorcycles.

In the prior art various vehicles of the type described have been disclosed, the closest to the present invention being thought to be as follows:

U.S. Pat. No. 3,583,727 to George L. Wallis, June 8, 1971, disclosing a trailing link rear suspension in a three wheel vehicle, with an axle connecting the rear wheels and without pivotal equalization of the nature of this invention;

U.S. Pat. No. 3,572,456 to Arthur D. Healy, Mar. 30, 1971, disclosing parallelogramming centrally pivoted suspension, a different geometrical arrangement from this invention; U.S. Pat. No. 3,504,934 to G. L. Wallis Apr. 7, 1970, disclosing a pivotal rear axle with a single spring shock absorber in the center, in contrast with the individual axle/dashpot arrangement in this invention;

U.S. Pat. No. 2,521,986 to M. M. H. Lips, Sept. 12, 1950, disclosing a steering type suspension with parallelogrammed leaf springs pivotally connected to the frame in the center, and contrasting with the non-steerable non-paralleling arrangement of this invention; and U.S. Pat. No. 2,887,322 to L. DeMonge, May 19, 1959, disclosing a central pivotal arm having spring connections at the end with wheel suspension structure, but without the trailing link suspension pivotal about the driveshaft helping provide the uniform drive in the present invention.

In brief summary given for purposes of cursive description only, the present invention includes an independent rear suspension in a motorcycle having an steerable front wheel and a pair of laterally related rear wheels mounted on respective trailing links journaled about the axis of a transverse driveshaft having a differential drive to the respective wheels; a shock absorbing system connects with the trailing links.

The above and other objects and advantages of the invention will become more readily apparent on examination of the following description, including the drawings in which like reference numerals refer to like elements:

The Figures are now referred to in detail.

Figure 1:
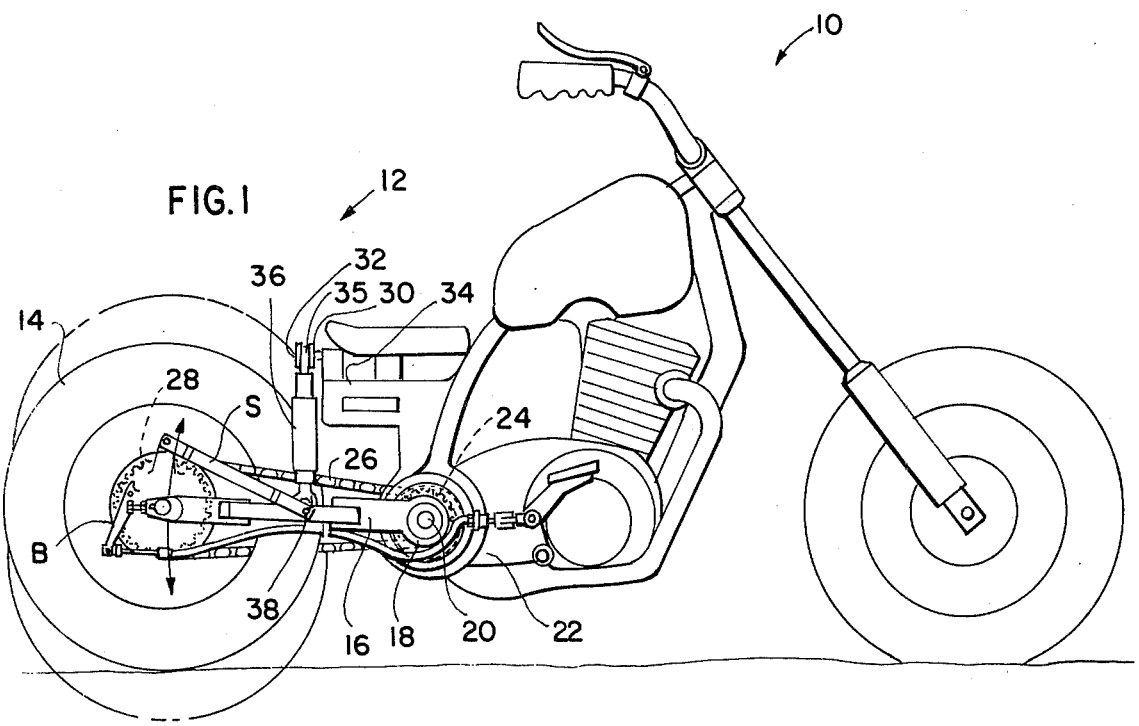
FIG. 1 is a side elevation of a motorcycle incorporating the invention.

FIG. 1 shows the right side of a motorcycle 10 having according to this invention a steerable front wheel assembly and an independent rear suspension and drive assembly 12 for a pair of laterally related rear wheels 14 (and 14', not shown); the arrangement is substantially symmetrical about a fore-and-aft vertical plane, and left-side parts are referred to by primed numerals.

The rear wheels can rise and fall separately indicated by the phantom lines and curved arrow by means of the following arrangement.

The wheels 14 are respectively mounted in trailing links 16 which have journals 18 at the forward ends supporting them, and thus the wheels, pivotally about the axis of transverse driveshaft 20, so that weight is transferred equally to each wheel from the center of gravity. The transverse drive-shaft is journaled in the engine/transmission housing 22 ahead of the rear wheels, and comprises two coaxial lengths connected to each other and to the transmission through differential gearing in the customary manner. Each of the two differential-related lengths of driveshaft connects through a sprocket and chain, 24 and 26 indicated, with a respective wheel drive sprocket 28 indicated. A transverse arm 30 having a pivotal connection 32 centrally to the frame 34 of the motorcycle, has at each end a dashpot, 36, having a pivot or a rubber mounting 35 at the top and a universal pivotal connection 38 at the lower end to a respective trailing link 16.

The motorcycle has the usual brake structure, with the stationary friction member B anchored by a strut S to the trailing link.

Figure 2:
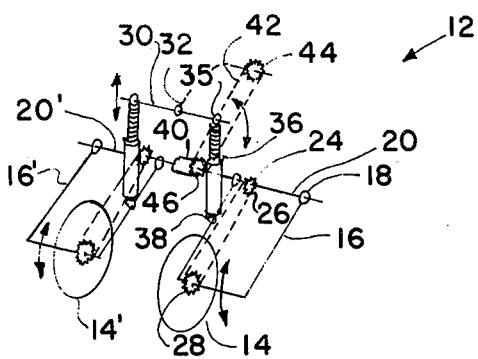
FIG. 2 is an isometric diagram of the rear wheels mounted on respective trailing links journaled about the transverse driveshaft and driven from it through a differential connection with the motor output; a crossover dashpot system above centrally pivots to the frame and connects with the respective trailing links.

FIG. 2 diagrams the independent rear suspension and drive described in reference to the previous Figure.

The rear wheels 14, 14' are mounted on respective trailing links 16, 16' which have journals 18 at the forward end over co-axial lengths 20, 20' of the driveshaft connected by a differential 40 to each other and to the engine output represented by chain 42 and sprockets 44, 46 driving the differential. Respective sprockets 24 on the driveshaft lengths drive the rear wheels through respective chains 26 and wheel drive sprockets 28.

Transverse arm 30 has a central pivot 32 to the frame of the motorcycle, and at each end has rubber journaled or universal pivotal connection 35 with a respective sprung dashpot 36 which in turn has universal connection 38 at the bottom with the respective trailing links rearward of the driveshaft.

It can be seen that regardless of whether a chain drive as shown is used, or equivalent gearing or belting, the rear wheels can rise and fall independently while being uniformly driven through the differential, tending always to keep both rear wheels on the ground and reduce skidding. The shock absorbing system represented by the dashpots more freely permits one wheel or the other to rise then it does both wheels at once, providing freedom to bank into turns like a two-wheel motorcycle while resistively cushioning the effects of uneven surfaces which tend to cause both rear wheels to lift at the same time.

Figure 3:
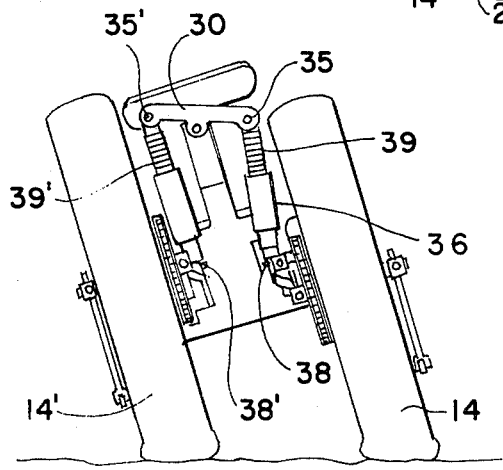
FIGS. 3 and 4 are rear elevations showing aspects of the rear suspension and drive.

FIG. 3 indicates the equalizing pivoting of the transverse arm 30 which permits the motorcycle to be banked freely. The restoring-forces of the conventionally arranged dashpot compression-springs 39, 39' are balanced against each other, and are designed to be weak, by choosing spring constants too low to maintain the motorcycle in a standing position when stationary. The spacing between the pivots 35, 35' on the transverse arm may advantageously be longer than the spacing between the respective lower pivots 38, 38' of the dashpots 36, so that the dashpots diverge outwardly in the upward direction and by reaction when one wheel lifts tend to urge the trailing links downwardly rather than slightly outwardly.

Figure 4:
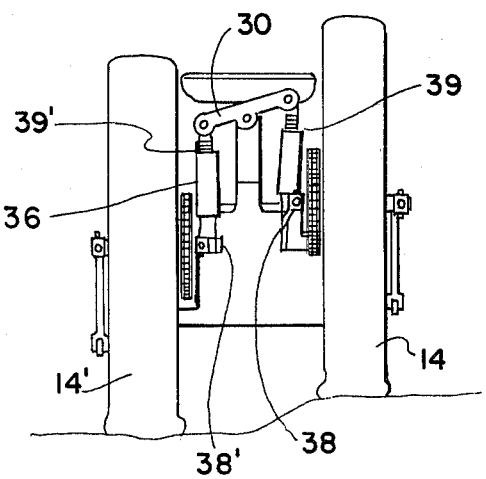

FIG. 4 shows the aspect assumed when one wheel passes over an obstacle.

Figure 5:
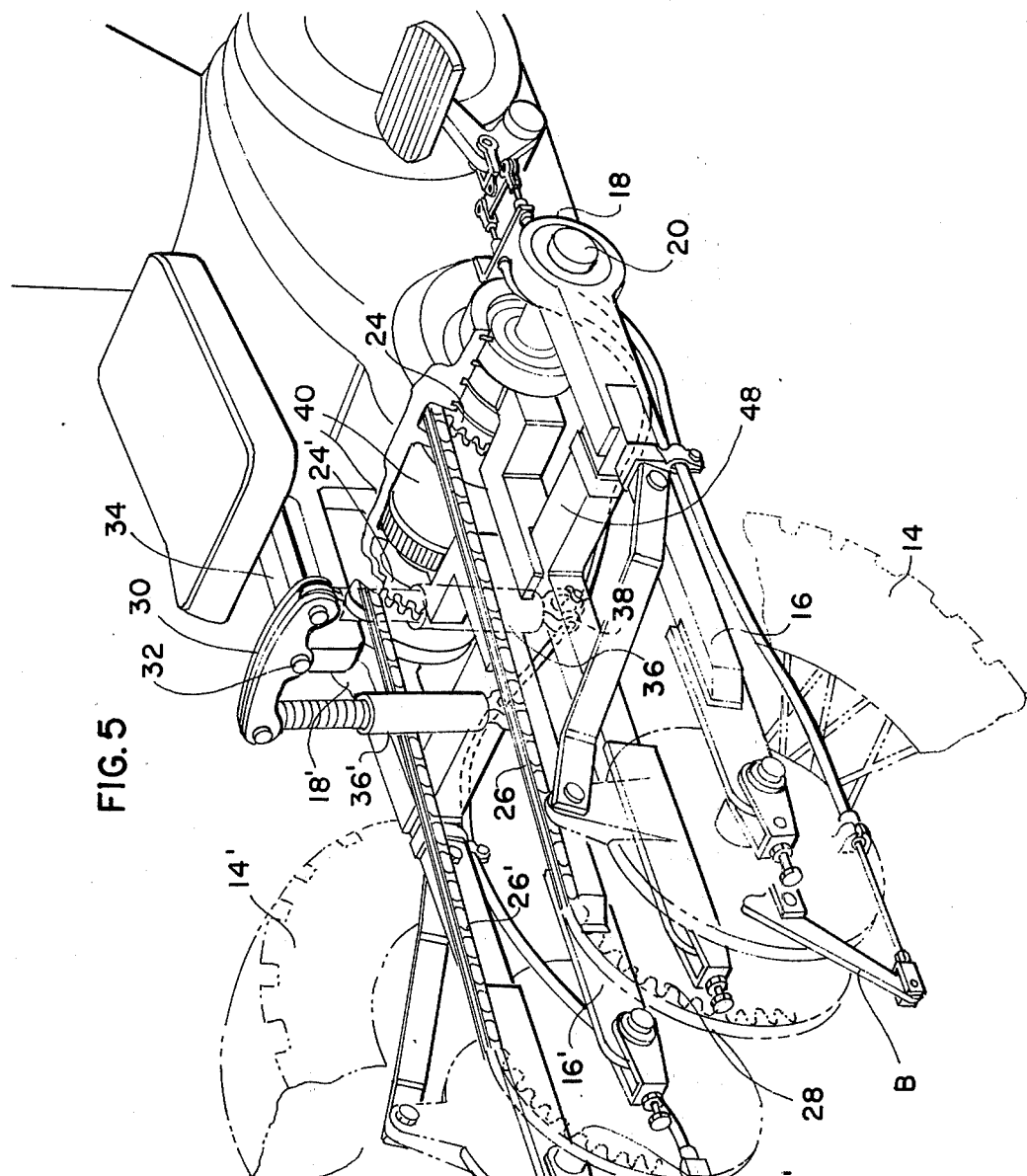
FIG. 5 is an isometric drawing of the rear suspension and drive, in part fragmentary and broken away.

FIG. 5 illustrates generally the structure previously described, the rear wheels 14, 14' on the trailing links 16, 16' having forward journals 18, 18' over driveshaft 20 (20' not shown) which connects through differential means 40 to the engine and to sprockets 24, 24' respectively driving the rear wheels through endless chains 26, 26' and wheel drive sprockets 28, 28', so that the center distance of the sprockets of each chain remains constant regardless of wheel rise or fall.

Transverse arm 30, with central pivot 32 to the frame 34 of the motorcycle, pivotally connects at the ends with dashpots 36, 36' which have pivotal connections 38 to the respective trailing arms, which are preferably generally "H" shaped with the crossbar 48 keeping the "H" in plane, the forward ends being journaled to the driveshaft as noted and the rearward ends securing the respective ends of the rear axles. The usual brake structure B is provided, and rides on the trailing arms.

The overall ruggedness, compactness, rigidity, and low center of gravity will be apparent.

Figure 6:
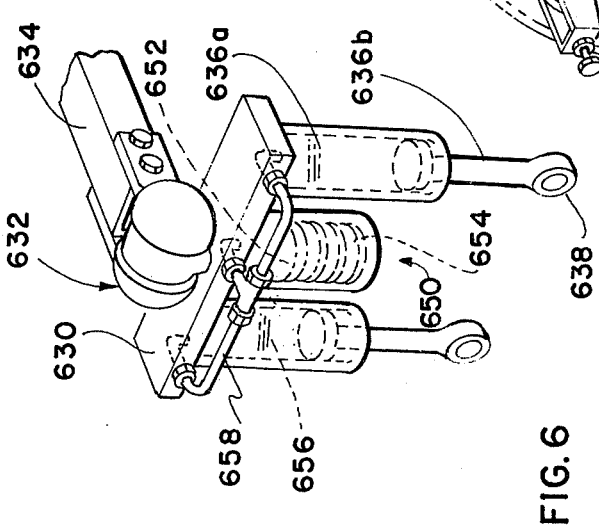
FIG. 6 is an isometric drawing of an alternative embodiment of a dashpot system.

FIG. 6 illustrates an alternative dashpot structure. Frame 634 has universal pivot structure 632 mounted at the center of transverse arm 630. A dashpot assembly comprising the usual cylinder 636 a and in-cylinder piston 636 b arrangement is fixed at each end of the transverse arm with the lower ends of the assemblies fitted with universal rod-end connections 638 for attachment to the trailing links.

Between the first and second dashpots an accumulator 650 is mounted, consisting of the customary blind piston 652 urged by a spring 654 against fluid contained in upper portion of the accumulator and the system generally. The fluid 656, which may be conventional hydraulic system fluid, fills the chambers defined by the pistons and cylinders of the dashpots and accumulator piston, cylinder and spring structure, and a manifold 658 connects all these chambers to provide free flow from one to the other of the fluid, always under pressure of the spring. The manifold is so proportioned that when the motorcycle banks gradually, the system offers virtually no resistance, but when one or both wheels jolt upward during operation the spring and constricted flow of the manifold join to provide shock absorbing action.

In conclusion, the overall wheel-shielded structure of the drive mechanism functions for the purpose intended and is made relatively inaccessible to damage and unlikely to injure the user, as well as durable and economical.

A surprising ease in riding qualities has been reported after test rides of an embodiment of the invention, the report being that "the smooth soft ride is unbelievable—much more than I had imagined".

Obviously, many modifications and variations of the present invention are possible in light of the above teachings. For example, the differential described may be substituted by a fluid coupling or any other equivalent device permitting the wheels to have independent drive analogous to the differential drive. As another example, the drive chain may be not directly as disclosed but also from an idler or other sprocket not coincident with the driveshaft. It is, therefore, to be understood that within the scope of the appended claims the invention may be practiced otherwise than as specifically described.

What is claimed and desired to be protected by United States Letters Patent is:

1. In a motorcycle having a frame, a steerable front wheel, first and second laterally related rear wheels having respective axles, a wheel suspension system connecting all said wheels with the frame, an engine, and means connecting the engine with the rear wheels, the improvement comprising: the connecting means including: a driveshaft transversely journaled in the frame, means for rotating all said rear wheels in response to driveshaft rotation, the driveshaft having a differential therein responsive to the means for rotating the driveshaft whereby each rear wheel can be rotated relative to the other said rear wheel, the suspension system including means pivotally supporting each rear wheel independently about the driveshaft axis, the wheel suspension system including a transverse arm having first and second ends and a pivotal connection to the frame intermediate said ends, first and second dashpot members, each dashpot member having connection at the upper end thereof with a respective end of said transverse arm, and each dashpot member having a pivotal connection at the lower end thereof with a respective means for supporting a rear wheel.

2. In a motorcycle as recited in claim 1, each dashpot member connection at the upper end thereof being a pivotal connection, each dashpot member having a spring for exerting a force in alignment with the direction of operation, of the respective dashpot member the direction of force of one said spring being opposed to that of the other said spring, and the spring-constant of said springs being less than sufficient to maintain said motorcycle upright on the wheels thereof when stationary.

3. In a motorcycle as recited in claim 2, the means pivotally supporting each rear wheel independently about the driveshaft axis including a first trailing link having a portion extending rearwardly from the driveshaft alongside the first rear wheel and engaging the axle thereof, a second trailing link having a portion extending rearwardly from the driveshaft alongside the second rear wheel and engaging the axle thereof, the means for rotating at least one rear wheel including: a first driveshaft output member on a first side of the differential, a first drive member on said first wheel, a first elongage member operatively connecting the first driveshaft output member and the first drive member, and a second driveshaft output member on a second side of the differential, a second drive member on said second wheel, a second elongate member operatively connecting the second drive-shaft output member and the second drive member.

4. In a motorcycle as recited in claim 3, all said operative connection of the respective driveshaft members with the drive members by the elongate members being on the inner sides of the respective wheels, thereby being compactly laterally associated, and being shielded by the wheels proximately outboard thereof.

5. In a motorcycle as recited in claim 4, all said pivotal connections at the lower ends of the respective dashpot members to the respective trailing links being on the inner sides of the respective wheels, thereby being shielded by the wheels proximately outboard thereof.

6. In a motorcycle as recited in claim 5, each said trailing link being in the shape of an "H" in plan, with the forward ends thereof journaled to the driveshaft, the rearward ends affixed to the axle of a respective wheel, and the crossbar of the "H" shape holding the "H" shape in-plane.

7. In a motorcycle as recited in claim 6, all said driveshaft output members and drive members being sprockets, and all said elongate members being chains.

8. In a motorcycle having a frame, a steerable front wheel, first and second laterally related rear wheels having respective axles, a wheel suspension system connecting all said wheels with the frame, an engine, and means connecting the engine with the rear wheels, the improvement comprising: the connecting means including: a driveshaft transversely journaled in the frame, means for rotating the driveshaft in response to the engine, means for rotating all said rear wheels in response to driveshaft rotation, the driveshaft having a differential therein responsive to the means for rotating the driveshaft whereby each rear wheel can be rotated relative to the other said rear wheel, the suspension system including means pivotally supporting each rear wheel independently about the driveshaft axis, the wheel suspension system including a transverse arm having first and second ends and a pivotal connection to the frame intermediate said ends, first and second dashpot members, each dashpot member having connection at the upper end thereof with a respective end of said transverse arm, each dashpot member having a pivotal connection at the lower end thereof with a respective means for supporting a rear wheel, each dashpot member including a cylinder having fluid therein and a piston in the cylinder, an accumulator member having fluid therein with a spring-loaded piston for exerting pressure on the fluid; and a manifold interconnecting the fluid in all said accumulator and dashpot members.

9. In a motorcycle having a frame, a steerable front wheel, first and second laterally related rear wheels having respective axles, a wheel suspension system connecting all said wheel with the frame, an engine, and means connecting the engine with the rear wheels, the improvement comprising: the connecting means including: a driveshaft transversely journaled in the frame, means for rotating the driveshaft in response to the engine, means for rotating all said rear wheels in response to driveshaft rotation, the drive-shaft having a differential therein responsive to the means for rotating the driveshaft whereby each rear wheel can be rotated relative to the other said rear wheel, the suspension system including means pivotally supporting each rear wheel independently about the driveshaft axis, the means pivotally supporting each rear wheel independently about the driveshaft axis including a first trailing link having a portion extending rearwardly from the driveshaft alongside the first rear wheel and engaging the axle thereof, a second trailing link having a portion extending rearwardly from the driveshaft alongside the second rear wheel and engaging the axle thereof, the means for rotating at least one rear wheel including: a first driveshaft output member on a first side of the differential, a first drive member on said first wheel, a first elongate member operatively connecting the first driveshaft output member and the first drive member, a second driveshaft output member on a second side of the differential, a second drive member on said second wheel, a second elongate member operatively connecting the second driveshaft output member and the second drive member, all said operative connection of the respective driveshaft members with the drive members by the elongate members being on the inner sides of the repective wheels, thereby being compactly laterally associated and shielded by the wheels proximately outboard thereof, the wheel suspension system including a transverse arm having first and second ends and a pivotal connection to the frame intermediate said ends, first and second dashpot members, each dashpot member having connection at the upper end thereof with a respective end of said transverse arm, and each dashpot member having a pivotal connection at the lower end thereof with a respective said trailing link all said pivotal connections at the lower ends of the respective dashpot members to the respective trailing links being on the inner sides of the respective wheels, thereby being shielded by the wheels proximately outboard thereof, and the respective dashpot members extending downwardly and inwardly from the respective ends of the transverse arm to said respective pivotal connections at the lower ends, whereby on pivoting of the transverse arm, as by rising or falling of one of said trailing links relative to the other of said trailing links, the upper ends of the dashpot members move closer in alignment with the lower ends of the dashpot members.

* * * * *